United States Patent
Bonadies et al.

(10) Patent No.: US 7,188,469 B2
(45) Date of Patent: Mar. 13, 2007

(54) EXHAUST SYSTEM AND METHODS OF REDUCING CONTAMINANTS IN AN EXHAUST STREAM

(75) Inventors: Joseph V. Bonadies, Clarkston, MI (US); Joachim Kupe, Davisburg, MI (US)

(73) Assignee: Delphi Technologies, Inc., Troy, MI (US)

( * ) Notice: Subject to any disclaimer, the term of this patent is extended or adjusted under 35 U.S.C. 154(b) by 45 days.

(21) Appl. No.: 11/022,501

(22) Filed: Dec. 22, 2004

(65) Prior Publication Data

US 2005/0138916 A1   Jun. 30, 2005

Related U.S. Application Data

(60) Provisional application No. 60/533,005, filed on Dec. 29, 2003.

(51) Int. Cl.
*F01N 3/00* (2006.01)
*F01N 3/10* (2006.01)
*C01B 3/24* (2006.01)
*C01B 3/26* (2006.01)

(52) U.S. Cl. ............... 60/286; 60/287; 60/299; 60/301; 423/650; 423/651

(58) Field of Classification Search ............ 60/286, 60/287, 299, 301; 423/650
See application file for complete search history.

(56) References Cited

U.S. PATENT DOCUMENTS

| | | | | |
|---|---|---|---|---|
| 5,265,419 | A * | 11/1993 | Bergmann et al. ............ | 60/297 |
| 6,176,078 | B1 | 1/2001 | Balko et al. ................. | 60/274 |
| 6,334,986 | B2 * | 1/2002 | Gieshoff et al. .......... | 423/239.1 |
| 6,363,716 | B1 * | 4/2002 | Balko et al. ................. | 60/286 |
| 6,365,118 | B1 | 4/2002 | Kharas et al. ........... | 423/213.2 |
| 6,423,190 | B2 | 7/2002 | Hemingway et al. ....... | 204/164 |
| 6,464,945 | B1 | 10/2002 | Hemingway ................ | 422/174 |
| 6,482,368 | B2 | 11/2002 | Hemingway et al. .. | 422/186.04 |
| 6,560,958 | B1 | 5/2003 | Bromberg et al. ............ | 60/275 |
| 6,638,484 | B2 | 10/2003 | Nelson et al. ......... | 422/186.04 |
| 6,662,552 | B1 * | 12/2003 | Gunther et al. ............... | 60/286 |
| 6,823,663 | B2 * | 11/2004 | Hammerle et al. ........... | 60/286 |
| 6,829,891 | B2 * | 12/2004 | Kato et al. .................... | 60/297 |

(Continued)

FOREIGN PATENT DOCUMENTS

EP   0 773 354 B1   10/2001

(Continued)

OTHER PUBLICATIONS

JP Patent No. JP406117224A, Publication Date: Apr. 26, 1994, Abstract Only, 1 page.

(Continued)

*Primary Examiner*—Thomas Denion
*Assistant Examiner*—Loren Edwards
(74) *Attorney, Agent, or Firm*—Paul L. Marshall

(57) ABSTRACT

In one embodiment, a method of reducing NOx contaminant in an exhaust stream includes: introducing diesel fuel and an oxidant to a reformer to produce a reformer effluent comprising hydrogen and nitrogen, introducing the reformer effluent to a non-thermal plasma reactor to produce ammonia, and introducing an exhaust stream and the ammonia to a SCR catalyst, whereby the NOx contaminant reacts with the ammonia.

19 Claims, 1 Drawing Sheet

U.S. PATENT DOCUMENTS

| | | | |
|---|---|---|---|
| 2001/0041153 A1 | 11/2001 | Benz | 522/169 |
| 2002/0023435 A1* | 2/2002 | Woerner et al. | 60/297 |
| 2002/0033017 A1* | 3/2002 | Bruggemann et al. | 60/295 |
| 2002/0073692 A1 | 6/2002 | Katashiba et al. | 60/275 |
| 2003/0033799 A1* | 2/2003 | Scheying | 60/286 |
| 2003/0150709 A1 | 8/2003 | LaBarge et al. | 204/164 |
| 2003/0182930 A1 | 10/2003 | Goulette et al. | 60/275 |
| 2003/0209011 A1* | 11/2003 | Duvinage et al. | 60/286 |
| 2003/0221360 A1 | 12/2003 | Brown et al. | 44/301 |
| 2003/0226350 A1* | 12/2003 | Liu | 60/275 |
| 2004/0237507 A1* | 12/2004 | Duvinage et al. | 60/276 |

FOREIGN PATENT DOCUMENTS

| | | |
|---|---|---|
| EP | 1 023 935 B1 | 6/2004 |
| JP | 6-117224 | 4/1994 |
| JP | 06-336914 | 12/1994 |
| WO | WO 02/094420 A1 | 11/2002 |
| WO | WO 02/100519 A1 | 12/2002 |
| WO | WO 03/009925 A1 | 2/2003 |

OTHER PUBLICATIONS

EP Patent No. EP1023935, Publication Date: Aug. 2, 2000, Abstract Only, 1 page.

* cited by examiner

EXHAUST SYSTEM AND METHODS OF REDUCING CONTAMINANTS IN AN EXHAUST STREAM

CROSS REFERENCE TO RELATED APPLICATIONS

The present application claims priority to Provisional U.S. Patent Application No. 60/533,005 filed Dec. 29, 2003, which is hereby incorporated by reference in its entirety.

BACKGROUND

Up coming emission regulations for diesel engines are driving original equipment manufacturers (OEMs) to incorporate aftertreatment devices, e.g., exhaust emission control devices, into the exhaust systems in order to comply with these regulations. These exhaust emission control devices could include: catalytic converters (e.g., three-way catalyst, oxidation catalysts, selective catalytic reduction (SCR) catalysts, and the like), evaporative emissions devices, scrubbing devices (e.g., hydrocarbon (HC), sulfur, and the like), particulate filters/traps, adsorbers/absorbers, plasma reactors (e.g., non-thermal plasma reactors), and the like.

A major challenge in meeting the future diesel emission requirements is treating the oxides of nitrogen (NOx) due to the inherently lean exhaust air-to-fuel ratio. One method of treating the NOx is the use of SCR catalysts that use ammonia as the reducing agent. Currently, ammonia is produced on-board a vehicle by injecting aqueous urea into the hot exhaust gas, upstream of the SCR catalyst. The urea decomposes to ammonia in the exhaust system and is absorbed by the SCR catalyst. The ammonia then reduces the NOx to nitrogen ($N_2$) in the presence of the catalyst.

A major drawback of the urea SCR system is the requirement to carry a second fluid, urea, on the vehicle in addition to diesel fuel. In addition, a nationwide urea distribution network must be established and maintained to provide a reliable supply to vehicle operators. Thus, a method to generate ammonia on-board the vehicle, using the available diesel fuel is highly desirable to vehicle manufacturers and operators.

SUMMARY

Disclosed herein are methods for reducing contaminants in an exhaust stream as well as exhaust systems. In one embodiment, the method of reducing NOx contaminant in an exhaust stream can comprise: introducing diesel fuel and an oxidant to a reformer to produce a reformer effluent comprising hydrogen and nitrogen, introducing the reformer effluent to a non-thermal plasma reactor to produce ammonia, and introducing an exhaust stream and the ammonia to a SCR catalyst, whereby the NOx contaminant reacts with the ammonia.

In one embodiment, the exhaust system can comprise: a reformer in fluid communication with a non-thermal plasma reactor and a diesel engine in fluid communication with a SCR catalyst through an exhaust conduit. The non-thermal plasma reactor can be located downstream of the reformer and in fluid communication with and upstream of the SCR catalyst.

The above-described and other features will be appreciated and understood by those skilled in the art from the following detailed description, drawings, and appended claims.

BRIEF DESCRIPTION OF THE DRAWINGS

Refer now to the figures, which are exemplary embodiments, and wherein the like elements are numbered alike.

DETAILED DESCRIPTION

Figure 1:
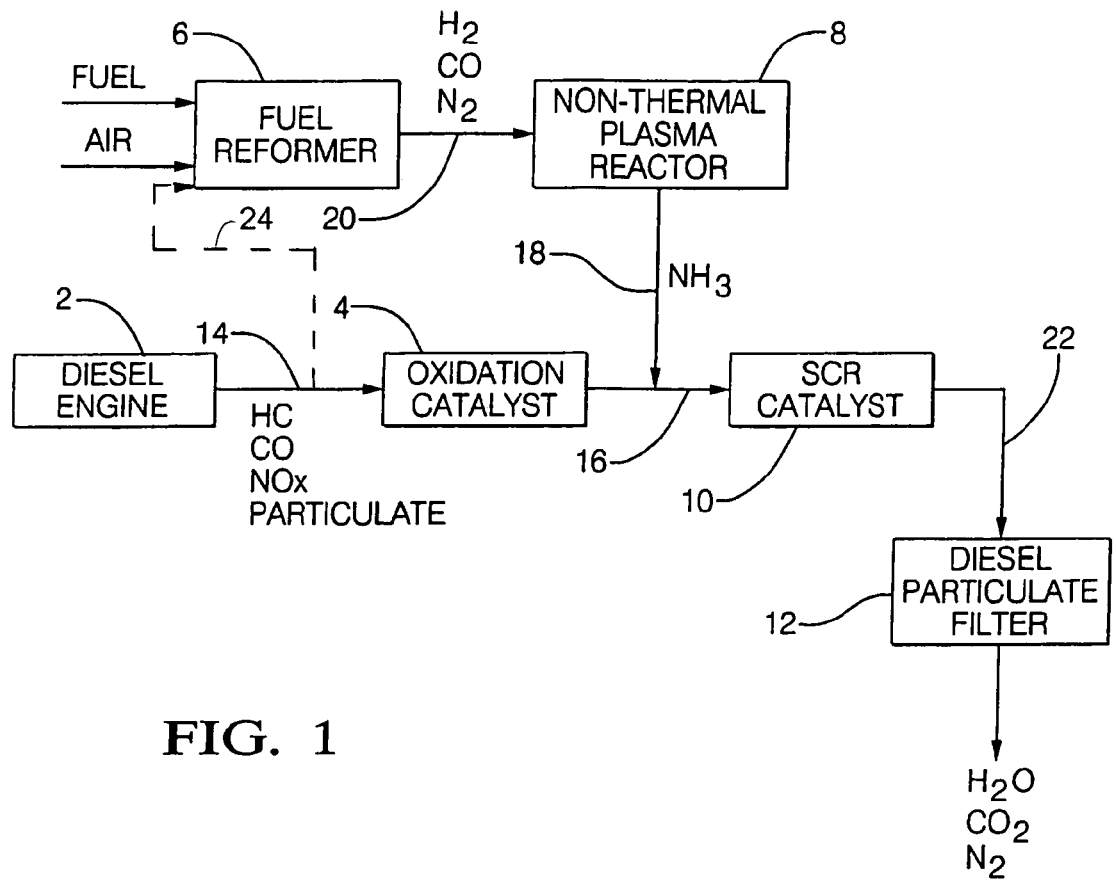
FIG. 1 is a schematic of an exemplary exhaust system comprising a fuel reformer and a non-thermal plasma reactor.

FIG. 1 illustrates an exemplary exhaust system with a reformer and non-thermal plasma (NTP) reactor located off-line (i.e., they do not receive exhaust gas from the engine). It is noted that the exhaust system components may be arranged in various configurations depending on the application requirements. In this system, hydrocarbons (HC), carbon monoxide (CO), nitrogen oxides (NOx), and particulate matter (PM) (e.g., soot, and the like) exit from an engine 2 (e.g., a diesel engine). From the engine, the exhaust stream 14 enters an oxidation catalyst 4 where HC, CO, and PM are oxidized to $H_2O$ and $CO_2$. Prior to, or upon, introduction to the selective catalytic reduction catalyst (SCR) 10, ammonia ($NH_3$) in NTP effluent stream 18 is introduced to the oxidation catalyst effluent stream 16. In the SCR catalyst 10, NOx is reacted with the $NH_3$ to form $N_2$ and $H_2O$. The $NH_3$ employed in the SCR catalyst 10 is produced by combining fuel and air in a reformer 6. Optionally, the oxidant in the reformer 6 can be exhaust (directly from the engine 2, and/or from any point in the exhaust conduit (14, 16, 22, etc.). The reformer effluent 20, comprising $H_2$ and $N_2$ (e.g., about 21 mol % $H_2$ and about 60 mol % $N_2$ based upon the total moles of effluent) is reacted in a non-thermal plasma (NTP) reactor 8 to produce $NH_3$.

In order to efficiently employ this system in a vehicle and in similar applications, the reformer converts diesel fuel (already available on the vehicle for use in the engine) to $H_2$ and $N_2$. These products are then used to generate the $NH_3$ for use in NOx reduction. The chemical mechanism occurring within the non-thermal plasma reactor is:

$$3H_2 + N_2 \rightarrow 2NH_3$$

The NTP reactor 8 can comprise several kinds of configurations, including an electrified packed bed reactor, a glow-discharge plasma reactor, a corona discharge reactor, a RF discharge reactor, a pulsed corona reactor, a dielectric-barrier discharge reactor, surface discharge reactor, or the like, as well as combinations comprising at least one of these types of reactors. A non-thermal plasma can be generated by several methods, such as electrical fields, electron beams, and irradiation with electromagnetic energy of appropriate intensity and wavelength, with generation by electrical fields desirable. Preferably, a flat plate dielectric barrier type reactor is used. Exemplary non-thermal plasma reactors are disclosed, for example, in U.S. patent Publication Nos. 20030182930 A1 to Goulette et al., and 20030150709 A1 to LaBarge et al., U.S. Pat. Nos. 6,423,190, 6,464,945, and 6,482,368 to Hemingway et al., and U.S. Pat. No. 6,638,484 to Nelson et al.

In order to attain the desired ammonia yield from the non-thermal plasma reactor, the power to the reactor, the electric field strength, and/or the temperature of the incoming gases can be controlled. The non-thermal plasma reactor may be controlled by varying the power applied to the incoming gasses (e.g., measured in joules/liter), with a power density of greater than or equal to about 90 joules/liter possible, and greater than or equal to about 100 joules/liter preferred to maximize the ammonia yield. In addition to the power, the electrical field strength within the discharge zone of the reactor can be controlled. The electrical field strength can be maintained greater than or equal to about 300 Townsend (Td), e.g., to increase the fraction of electron energy above the $N_2$ dissociation energy of 14.3 electron volt (eV). The temperature of the incoming gasses from the fuel reformer is preferably about 100° C. to about 600° C.

Disposed upstream from the NTP reactor 8, and preferably in direct communication therewith, is the fuel reformer 6. Fuel reformer 6 comprises a reformer treatment element that is adapted to generate a hydrogen and carbon monoxide containing fluid from a fuel supplied by a fuel source, e.g., diesel fuel, and an oxidant (e.g., air, exhaust bleed (also referred to as exhaust gas recirculation or recycle (EGR) 24 (a portion of the exhaust stream directed to the reformer), and the like). The term "direct fluid communication" as used herein refers to a communication between a first point and a second point in the exhaust system, i.e., uninterrupted by the presence of additional reaction devices, such as, a reactor, converter, trap, adsorber, and the like, but may have flow controls and monitors (such as valve(s), flow regulator(s), sensor(s) (oxygen, hydrocarbon, NOx, $NH_3$, and the like) and the like), that are not used for purposes of a chemical change in the composition of the stream.

The reformer generates a hydrogen-rich gas from a fuel source. The hydrogen rich gas includes, for example, hydrogen, carbon monoxide, carbon dioxide, one carbon species, two carbon species, three carbon species, water, and combinations comprising one or more of the foregoing species. The reformer may be configured for partial oxidation, steam reforming, and/or dry reforming, with a partial oxidation reformer generally preferred.

Partial oxidation reformers are based on sub-stoichiometric combustion to achieve the temperatures necessary to reform hydrocarbon fuel. Decomposition of fuel to primarily hydrogen and carbon monoxide occurs through thermal reactions at temperatures of about 800° C. to about 1,200° C. The partial oxidation reactions are exothermic and fuel consumption is not needed to supply the thermal energy. The use of a reformer catalyst can result in acceleration of the reforming reactions and can provide this effect at lower reaction temperatures than those that would otherwise be required in the absence of a catalyst. An example of the partial oxidation reforming reaction is as follows:

$$CH_4 + 0.5O_2 \rightarrow CO + 2H_2$$

$$C_xH_y + 0.5xO_2 \rightarrow xCO + 0.5yH_2$$

In contrast, steam configured reformers react fuel and steam ($H_2O$) in heated tubes filled with catalysts to convert hydrocarbons into primarily hydrogen and carbon monoxide. An example of the steam reforming reaction is as follows:

$$CH_4 + H_2O \rightarrow CO + 3H_2$$

$$CO + H_2O \rightarrow CO_2 + H_2$$

Dry reforming systems form hydrogen and carbon monoxide in the absence of water, for example, by using carbon dioxide. An example of the dry reforming reaction is depicted in the following reaction:

$$CH_4 + CO_2 \rightarrow 2CO + 2H_2$$

Figure 2:
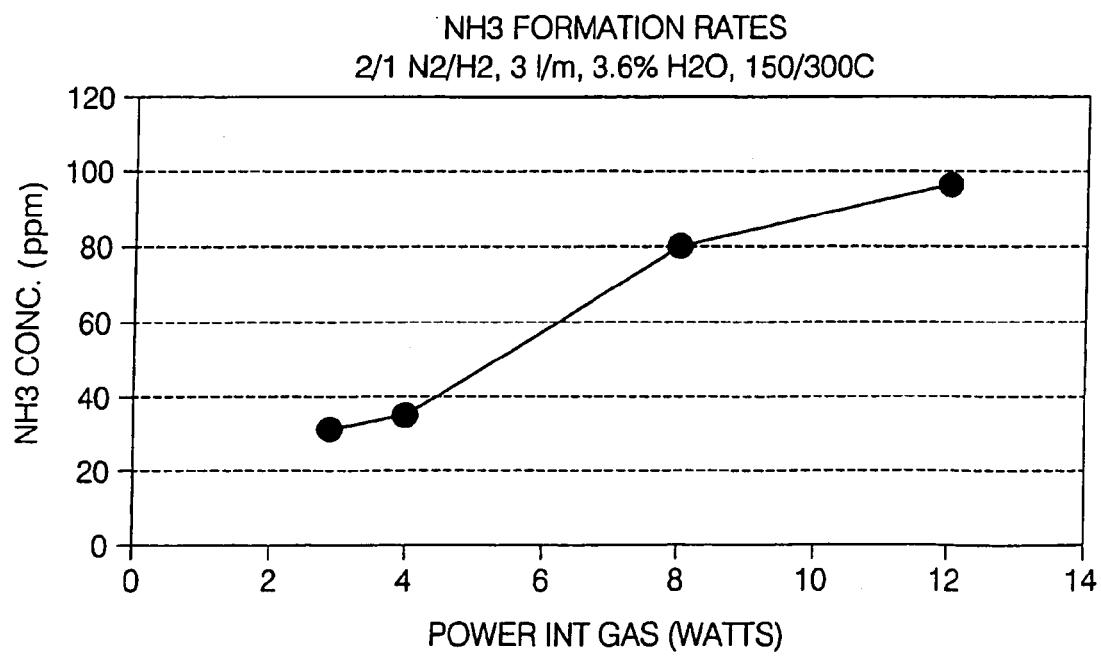
FIG. 2 is a graphical representation of ammonia formation rates; ammonia concentration versus power into the gas.

A plot of $NH_3$ concentration versus NTP reactor power is illustrated in FIG. 2. The output of the system may be scaled to meet the needs of the specific application. Typical power levels may be about 2 watts to about 1,500 watts, depending on flow rates and temperatures of the $H_2$ and $N_2$ feed gasses. In the graph illustrated in FIG. 2, the parameters were $N_2/H_2$ ratio of 2/1, a flow rate of 3 liters per minute (l/m), 3.6 mole percent (mol %) water ($H_2O$), and gas temperatures of 150° C. to 300° C.

Once $NH_3$ is produced in the NTP reactor 8, it can be introduced to an SCR catalyst 10 along with the effluent 16 from the oxidation catalyst 4. The oxidation catalyst 4 receives and oxidizes engine exhaust. The oxidation catalyst 4 can comprise a catalytic metal including, but not limited to, platinum, palladium, ruthenium, rhodium, osmium, iridium, gold, silver, aluminum, gallium, indium, tin, titanium, and other metals, as well as oxides, alloys, salts, and mixtures comprising at least one of the foregoing metals. Preferably, in various embodiments, oxidation catalyst 4 further comprises a zeolite. The zeolite can have a silica to alumina ratio of greater than or equal to about 10, with an average pore size taken (along the major axis) of about 4 angstroms (Å) to about 10 angstroms, with an average pore size of about 7 angstroms to about 8 angstroms preferred. Preferably, the zeolite is a ZSM-5 zeolite or a y-type zeolite. An exemplary oxidation catalyst is disclosed in U.S. Pat. No. 6,365,118 to Dou et al.

The particulate filter 12 can comprise any filter and design capable of removing particulate matter from the exhaust stream and preventing the emission of such particulate matter into the atmosphere. The particulate filter 12 generally comprises a shell and a filter with a retention material disposed therebetween.

The filter is generally desired to filter out the particulate matter present in the exhaust. The filter can comprise any material designed for use in the environment and which can remove particulate matter from a gaseous stream. Some possible materials include ceramics (e.g., extruded ceramics), metals (e.g., extruded, sintered metals), and silicon carbide; e.g., cordierite, aluminum oxide, aluminum phosphate and the like), sintered steel (preferably sintered stainless steel), and the like, and mixtures comprising at least one of the foregoing materials. For example, the filter can comprise a gas permeable ceramic material having a honeycomb structure consisting of a plurality of channels, preferably parallel channels. The channels can be divided into alternating inlet channels and exit channels. The inlet channels are open at an inlet end of the filter element and preferably plugged at the exit end. Conversely, exit channels are preferably plugged at the inlet end and open at the exit end. The inlet and exit channels are separated by thin porous longitudinal sidewalls, which permit the exhaust gases to pass from the inlet channels to the exit channels along their length.

A particulate filter 12 comprising a catalyst is preferably disposed upstream of both the $NH_3$ introduction point (e.g., a NTP connection point where the stream from the NTP connects to the exhaust conduit) to the exhaust stream and of the SCR catalyst or downstream of the SCR catalyst, to prevent oxidation of the $NH_3$ by the catalyst in the particulate filter 12. Additionally, if the exhaust system is employed in a light duty application (e.g., passenger cars, trucks, and the like), the particulate filter 12 preferably resides downstream of the SCR catalyst 10. In contrast, for heavy duty applications (e.g., large trucks such as farm equipment, construction equipment, and the like), the particulate filter 12 is preferably disposed upstream of both the $NH_3$ introduction point to the exhaust stream and of the SCR catalyst. Optionally, multiple particulate filters 12 can be employed, with one or more comprising a catalyst.

SCR catalyst 10 generally comprises a porous support, a catalyst material(s), and one or more $NO_X$ trapping materials. Suitable $NO_X$ trapping materials include alkali metals, alkaline earth metals, and the like, and combinations comprising at least one of the foregoing. Generally, the porous support, the catalyst material(s), and the $NO_X$ trapping materials employed in the SCR catalyst 10 are substantially the same as that used in $NO_X$ adsorbers. However, in the case of the SCR catalyst 10, the porous supports preferably do not have a glass protective layer, because various reducing agents may vaporize glass. Examples of porous support materials include zirconium toughened alumina, cordierite, metallic foils, alumina sponges, and the like, as well as combinations comprising at least one of the foregoing materials.

The porous support of the SCR catalyst further comprises one or more other support materials suitable for use at the high operation temperatures associated with an internal combustion engine (e.g., up to about 1,200° C.). Such materials include, but are not limited to, tungsten oxides, molybdenum oxides, vanadium oxides, niobium oxides, aluminates (e.g., hexaaluminates), alumina, and the like, as well as combinations comprising at least one of the foregoing, more particularly gamma alumina, theta alumina, and delta alumina in combination with at least one of tungsten oxide, molybdenum oxide, vanadium oxide and or niobium oxides. In addition to the catalytic metal component, the porous support may comprise a protective coating of phosphate or metal phosphate.

As with the SCR catalyst, the oxidation catalyst 4 comprises a substrate, catalytic material, and shell, with a retention material disposed between the substrate and the shell. The catalyst material(s) for the oxidation catalyst 4 should be capable of oxidizing at least one of HC and CO to water and $CO_2$, respectively. The substrate can comprise materials employed in the particulate filter and/or the SCR catalyst, such as any material designed for use in a spark ignition or diesel engine environment and having the following characteristics: (1) capable of operating at temperatures up to about 600° C., and up to about 1,000° C. for some applications, depending upon the device's location within the exhaust system (manifold mounted, close coupled, or underfloor) and the type of system (e.g., gasoline or diesel); (2) capable of withstanding exposure to hydrocarbons, nitrogen oxides, carbon monoxide, particulate matter (e.g., soot and the like), carbon dioxide, and/or sulfur; and (3) having sufficient surface area and structural integrity to support a catalyst, if desired. Some possible materials include cordierite, silicon carbide, metal, metal oxides (e.g., alumina, and the like), glasses, and the like, and mixtures comprising at least one of the foregoing materials. Some ceramic materials include "Honey Ceram", commercially available from NGK-Locke, Inc, Southfield, Mich., and "Celcor", commercially available from Corning, Inc., Corning, N.Y. These materials can be in the form of foils, perform, mat, fibrous material, monoliths (e.g., a honeycomb structure, and the like), other porous structures (e.g., porous glasses, sponges), foams, pellets, particles, molecular sieves, and the like (depending upon the particular device), and combinations comprising at least one of the foregoing materials and forms, e.g., metallic foils, open pore alumina sponges, and porous ultra-low expansion glasses. Furthermore, these substrates can be coated with oxides and/or hexaaluminates, such as stainless steel foil coated with a hexaaluminate scale.

Although the substrate can have any size or geometry, the size and geometry are preferably chosen to optimize surface area in the given exhaust emission control device design parameters. Typically, the substrate has a honeycomb geometry, with the combs through-channel having any multi-sided or rounded shape, with substantially square, triangular, pentagonal, hexagonal, heptagonal, or octagonal or similar geometries preferred due to ease of manufacturing and increased surface area.

Depending upon the exhaust emission control device (e.g., particulate filter, oxidation catalyst, SCR catalyst, and the like), optionally disposed on and/or throughout the substrate (porous support, filter, or the like) can be a catalyst capable of reducing the concentration of at least one component in the gas. The catalyst material(s) can be washcoated, imbibed, impregnated, physisorbed, chemisorbed, precipitated, or otherwise applied to the substrate (e.g., porous support, monolith, etc.). Possible catalyst materials include metals, such as platinum, palladium, rhodium, iridium, osmium, ruthenium, tantalum, zirconium, yttrium, cerium, nickel, molybdenum, tungsten, vanadium, niobium, tantalum, iron, cobalt, manganese, copper, and the like, as well as sulfides, oxides, alloys, and combinations comprising at least one of the foregoing catalyst materials, and other catalysts. The catalyst material may further be combined with additional materials or sequentially disposed on the substrate with these additional materials. The additional materials may comprise oxides (e.g., aluminum oxide, zirconium oxide, titanium oxide, cerium oxide, silicon oxide, and the like), aluminides, hexaaluminates, and the like, and solid solutions and combinations comprising at least one of the foregoing. The additional materials may further comprise stabilizing agents, such as, Group II metals, rare earth metals, Group VIII metals, and the like, as well as, oxides, alloys, and combinations comprising at least one of the foregoing. Preferred stabilizing agents include barium, platinum, palladium, osmium, strontium, lanthanum, ruthenium, iridium, praseodymium, rhodium, gold, manganese, cobalt, and the like, as well as, oxides, alloys, and combinations comprising at least one of the foregoing, with barium, lanthanum, and combinations comprising at least one of the foregoing particularly preferred. The particular catalyst composition can be determined by the type of reaction desired, e.g., particulate filtering and soot oxidation versus HC oxidation versus NOx reduction. Exemplary exhaust emission control devices include platinum oxidation catalysts, titanium-vanadium-tungsten oxide SCR catalysts, and an alumina particulate filter.

The catalyst material(s) disposed on the substrate are located within a shell. Possible materials for the shells for the exhaust emission control devices, independently include ferrous materials, such as ferritic stainless steels. Ferritic stainless steels include stainless steels (SS) such as the 400-Series, for example, SS-409, SS-439, and SS-441, and alloys, and the like, as well as combinations comprising at least one of the foregoing stainless steels, with SS-409 generally preferred.

Preferably, between the catalyzed substrate and the shell is a retention material that can assist in retaining the substrate in place and inhibiting damage thereto as well as can optionally insulate the shell. The retention material for these devices can, independently, comprise materials such as fiberglass, intumescent materials, non-intumescent materials, ceramic, mica based materials, and the like, as well as combinations comprising at least one of the foregoing retention materials. Additionally, these retention materials can be in any form compatible with the design of the exhaust emission control device. For example, the retention material can be in the form of a mat, particulates, felt, sponge, and/or the like.

For example, for passenger vehicles where exhaust temperatures are low (i.e., less than about 600° C.), a particulate filter comprising sintered metal is preferred, e.g., a sintered metal trap brazed into a "thermos bottle" type shell. The shell may be filled with a salt. Possible compounds include cesium-vanadium and cesium-molybdenum. For particularly cold applications, e.g., small cars, lithium oxide, potassium oxide and/or cesium-vanadium oxide may be added to the filter. For this application, various oxidation catalysts that have been employed in the art can be used; e.g., those comprising platinum group metal(s) dispersed on a refractory metal oxide support(s). Some exemplary oxidation catalysts are discussed in U.S. patent Publication No. 20030221360 A1. An exemplary SCR catalyst comprises titanium dioxide and/or zeolites(s) containing copper, iron, molybdenum, cerium, tungsten, silicon, boron, aluminum, phosphorus, zirconium, barium, yttrium, lanthanum, cerium, vanadium, niobium, molybdenum, iron, copper, and the like, as well as oxides and combinations comprising at least one of the foregoing. Some possible SCR catalysts are discussed, for example, in U.S. Pat. No. 6,334,986 B2 to Gieshoff et al.

Disposed in one or more of the streams (e.g., 14, 16, 18, 20, 22, etc.), can be sensor(s) (e.g., flow, temperature, pressure, oxygen, NOx, HC, oxygen, $NH_3$, as well as combinations comprising at least one of these sensors), valve(s), controller(s), and/or the like. For example, the concentration of the reformer effluent 20 can be controlled with flow sensor(s) on the air and fuel streams entering the fuel reformer, as well as with hydrocarbon sensor(s) on the effluent stream 20 and temperature sensor(s) on the fuel reformer 6. $NH_3$ sensor(s) can be employed on the NTP effluent stream 18, while $NH_3$ slip can be determined by monitoring the $NH_3$ concentration of the SCR effluent 22. These sensors as well as valves and other controls can be connected to a controller such as a computer or the like to adjust the flows, temperatures, etc., thereby enabling optimization of NOx, HC, and CO removal from the exhaust stream.

During use of this system, exhaust from a diesel engine is optionally treated with an oxidation catalyst and/or particulate filter (that may optionally comprise a catalyst) to produce a treated stream. The oxidation catalyst oxidizes at least one exhaust constituent (e.g., HC, CO, and the like) in the exhaust stream, while the particulate filter removes soot and the like as well as optionally oxidizes exhaust constituents (if it is catalyzed). Meanwhile, the reformer (e.g., POx reformer) receives diesel fuel and an oxidant (e.g., air, EGR, and/or the like) at a rate sufficient to produce the desired amount of reformate for use in the non-thermal plasma reactor. The oxidant entering the reformer (which can be external air, EGR from any desirable point in the exhaust system, and/or a combination comprising at least one of these forms of oxidant) is preferably heated to about 150° C. to about 400° C. The reformer effluent is preferably monitored, e.g., for temperature and/or concentration. The temperature of the reformer effluent can be controlled, e.g., via the type and/or length of conduit from the reformer to the non-thermal plasma reactor, and/or with the use of a heat exchanger. The effluent entering the non-thermal plasma reactor can be at a temperature of about 100° C. to about 600° C. The $NH_3$ produced in the non-thermal plasma reactor can be introduced to the treated stream to form a combined stream within or upstream of the SCR catalyst. Within the SCR catalyst NOx in the treated stream and the $NH_3$ can be converted to $N_2$ and $H_2O$. The SCR effluent can then optionally be filtered in a particulate filter that removes soot and other particulates that may remain in the SCR effluent. Again, the particulate filter may comprise a catalyst and/or an oxidation catalyst can also be disposed downstream of the SCR catalyst to prevent $NH_3$ breakthrough as well as to further remove other contaminants from the exhaust stream prior to venting to the environment.

The following examples are merely provided for illustrative purposes.

EXAMPLE 1

For a typical diesel engine operating at a low speed and low load condition (e.g., when producing NOx at a rate of 12 grams per hour (g/hr)), 4.5 g/hr of $NH_3$ could be used to completely reduce the NOx to $N_2$ and $H_2O$ using the following chemical mechanism:

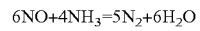
$6NO+4NH_3=5N_2+6H_2O$

The quantity of reformate, from the partial oxidation reformer (for the production of 4.5 g/hr of $NH_3$) could be approximately 43 g/hr, given a typical reformate composition of about 21 mol % $H_2$, about 24 mol % CO, and about 55 mol % $N_2$. Therefore, for example, employing a partial oxidation reformer with a platinum or rhodium catalyst, 7.2 g/hr diesel fuel and 35.8 g/hr air (e.g., at about 150° C. to about 400° C.) could be supplied to the reformer to produce the desired quantity of reformate.

EXAMPLE 2

For a high speed and high load, operating condition (e.g., where the diesel engine would produce 90 g/hr NOx), 34 g/hr $NH_3$ would be needed to completely reduce the NOx to $N_2$ and $H_2O$. The quantity of reformate, from the partial oxidation reformer (for the production of the 34 g/hr of $NH_3$), could be approximately 322 g/hr, given a typical reformate composition of 21 mol % $H_2$, 24 mol % CO, and 55 mol % $N_2$. Therefore, for example, employing a partial oxidation reformer with a platinum or rhodium catalyst, 53.7 g/hr diesel fuel and 268.3 g/hr air (e.g., at a temperature of about 150° C. to about 400° C.) could be supplied to the reformer to produce the desired quantity of reformate.

As there are several chemical reactions that reduce NOx using $NH_3$ in the SCR catalyst, one skilled in the art can determine the $NH_3$ needed to reduce the NOx to $N_2$ in a similar manner. These chemical reactions include, for example:

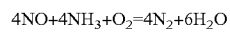
$4NO+4NH_3+O_2=4N_2+6H_2O$

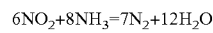
$6NO_2+8NH_3=7N_2+12H_2O$

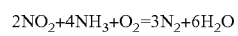
$2NO_2+4NH_3+O_2=3N_2+6H_2O$

$NO+NO_2+2NH_3=2N_2+3H_2O.$

The system and method disclosed herein efficiently and effectively remove contaminants from an exhaust gas stream using resources available on board the vehicle; i.e., resources currently employed by the vehicle without requiring additional resources. The present system can remove NOx, HC, and CO by reforming diesel fuel. An additional liquid, e.g., a tank of urea, is not required. $NH_3$ is produced from the diesel fuel that is already available in an off-line production scheme. The non-thermal plasma reactor, as well as the reformer, can be controlled by the engine management system and can generate ammonia on-demand such that the NOx emissions are reduced to the appropriate levels to meet emissions legislation.

Additional advantages of using direct ammonia synthesis include the elimination of concerns for operation in climates where the aqueous urea is exposed to temperatures below its freezing point, requiring heated tanks and heated lines. Also, urea caused deposits in the exhaust system are eliminated.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of reducing NOx contaminant in an exhaust stream, comprising:
    introducing diesel fuel and an oxidant to a reformer to produce a reformer effluent comprising hydrogen and nitrogen;
    introducing the reformer effluent to a non-thermal plasma reactor to produce ammonia;
    introducing the exhaust stream and the ammonia to a SCR catalyst, whereby the NOx contaminant reacts with the ammonia; and
    removing particulate matter from a SCR effluent stream that exits the SCR catalyst.

2. The method of claim 1, further comprising oxidizing an exhaust constituent in an oxidation catalyst, wherein the exhaust constituent comprises at least one of hydrocarbons and carbon monoxide.

3. The method of claim 1, further comprising oxidizing contaminants in a SCR effluent stream that exits the SCR catalyst.

4. The method of claim 1, wherein the reformer effluent enters the non-thermal plasma reactor at a temperature of about 100°C. to about 600° C.

5. The method of claim 1, further comprising controlling the non-thermal plasma reactor to have a fraction of electron energy above an $N_2$ dissociation energy.

6. The method of claim 1, further comprising producing the exhaust stream in a diesel engine.

7. A method of reducing NOx contaminant in an exhaust stream, comprising:
    introducing diesel fuel and an oxidant to a reformer to produce a reformer effluent comprising hydrogen and nitrogen;
    introducing the reformer effluent to a non-thermal plasma reactor to produce ammonia;
    introducing the exhaust stream and the ammonia to a SCR catalyst, whereby the NOx contaminant reacts with the ammonia; and
    removing particulate matter from the exhaust stream prior to contacting the exhaust stream with the ammonia.

8. A method of reducing NOx contaminant in an exhaust stream, comprising:
    introducing diesel fuel and an oxidant to a reformer to produce a reformer effluent comprising hydrogen and nitrogen;
    introducing the reformer effluent to a non-thermal plasma reactor to produce ammonia;
    introducing the exhaust stream and the ammonia to a SCR catalyst, whereby the NOx contaminant reacts with the ammonia; and
    controlling a power applied to the reformer effluent in the non-thermal plasma reactor, wherein a NTP power density is greater than or equal to about 100 joules/liter.

9. A method of reducing NOx contaminant in an exhaust stream, comprising:
    introducing diesel fuel and an oxidant to a reformer to produce a reformer effluent comprising hydrogen and nitrogen;
    introducing the reformer effluent to a non-thermal plasma reactor to produce ammonia;
    introducing the exhaust stream and the ammonia to a SCR catalyst, whereby the NOx contaminant reacts with the ammonia, wherein the non-thermal plasma reactor has an electrical field strength within a discharge zone of the non-thermal plasma reactor of greater than or equal to about 300 Td.

10. A method of reducing NOx contaminant in an exhaust stream, comprising:
    introducing diesel fuel and an oxidant to a reformer to produce a reformer effluent comprising hydrogen and nitrogen;
    introducing the reformer effluent to a non-thermal plasma reactor to produce ammonia; and
    introducing the exhaust stream and the ammonia to a SCR catalyst, whereby the NOx contaminant reacts with the ammonia, wherein the oxidant comprises exhaust gas recycle.

11. An exhaust system, comprising:
    a reformer in fluid communication with a non-thermal plasma reactor;
    a diesel engine in fluid communication with a SOR catalyst through an exhaust conduit; and
    an oxidation catalyst disposed upstream of a point where a non-thermal plasma reactor effluent can be introduced to the exhaust conduit,
    wherein the non-thermal plasma reactor is located downstream of the reformer and in fluid communication with and upstream of the SCR catalyst.

12. The exhaust system of claim 11, further comprising a first particulate filter disposed downstream of the SCR catalyst.

13. The exhaust system of claim 12, further comprising a second particulate filter disposed upstream of the point where the non-thermal plasma reactor effluent can be introduced to the exhaust conduit and downstream of the engine.

14. The exhaust system of claim 13, wherein the second particulate filter is disposed downstream of the oxidation catalyst.

15. The exhaust system of claim 14, wherein the second particulate filter comprises a catalyst.

16. The exhaust system of claim 11, further comprising a first particulate filter disposed upstream of the non-thermal plasma reactor effluent introduction point and downstream of the diesel engine.

17. The exhaust system of claim 11, further comprising a first particulate filter including a filter catalyst in fluid communication with the exhaust conduit.

18. The exhaust system of claim 11, wherein the point where the non-thermal plasma reactor effluent can be introduced to the exhaust conduit is disposed adjacent an inlet of the SCR catalyst.

19. The exhaust system of claim 11, further comprising a recycle conduit capable of directing exhaust to the reformer.

* * * * *